(12) United States Patent
Zhou et al.

(10) Patent No.: US 10,017,859 B2
(45) Date of Patent: Jul. 10, 2018

(54) POLYMER ARTICLES, INK COMPOSITIONS, AND METHODS FOR SELECTIVELY METALIZING POLYMER ARTICLES

(71) Applicant: BYD COMPANY LIMITED, Shenzhen, Guangdong (CN)

(72) Inventors: Fangxiang Zhou, Shenzhen (CN); Jiang Huang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 192 days.

(21) Appl. No.: 15/064,477

(22) Filed: Mar. 8, 2016

(65) Prior Publication Data

US 2016/0186322 A1 Jun. 30, 2016

Related U.S. Application Data

(63) Continuation of application No. PCT/CN2014/086022, filed on Sep. 5, 2014.

(30) Foreign Application Priority Data

Sep. 17, 2013 (CN) .......................... 2013 1 0425978

(51) Int. Cl.
| | |
|---|---|
| *C23C 18/16* | (2006.01) |
| *C08K 3/32* | (2006.01) |
| *C23C 18/20* | (2006.01) |
| *C23C 18/40* | (2006.01) |
| *C09D 11/322* | (2014.01) |
| *C09D 11/106* | (2014.01) |
| *C09D 11/14* | (2006.01) |
| *C23C 18/18* | (2006.01) |
| *C23C 18/28* | (2006.01) |
| *C08K 3/26* | (2006.01) |

(52) U.S. Cl.
CPC ............ *C23C 18/1608* (2013.01); *C08K 3/32* (2013.01); *C09D 11/106* (2013.01); *C09D 11/14* (2013.01); *C09D 11/322* (2013.01); *C23C 18/1612* (2013.01); *C23C 18/1641* (2013.01); *C23C 18/1882* (2013.01); *C23C 18/204* (2013.01); *C23C 18/206* (2013.01); *C23C 18/2066* (2013.01); *C23C 18/28* (2013.01); *C23C 18/405* (2013.01); *C08K 2003/265* (2013.01); *C08K 2003/321* (2013.01); *C08K 2003/325* (2013.01); *C08K 2003/326* (2013.01); *C08K 2003/328* (2013.01)

(58) Field of Classification Search
CPC ........... C23C 18/00; C23C 22/07; C08K 3/32; C08K 2003/231; C08K 2003/238
See application file for complete search history.

(56) References Cited

U.S. PATENT DOCUMENTS

| | | | |
|---|---|---|---|
| 5,489,639 | A | 2/1996 | Faber et al. |
| 5,702,584 | A | 12/1997 | Goenka et al. |
| 2003/0031803 | A1 | 2/2003 | Belouet et al. |
| 2004/0241422 | A1 | 12/2004 | Naundorf et al. |
| 2007/0155881 | A1 | 7/2007 | Hirthe et al. |
| 2011/0212344 | A1 | 9/2011 | Gong et al. |
| 2011/0281135 | A1 | 11/2011 | Gong et al. |
| 2012/0065313 | A1 | 3/2012 | Demartin Maeder et al. |
| 2014/0066560 | A1* | 3/2014 | Stoppelmann ........... C08K 7/14 524/407 |

FOREIGN PATENT DOCUMENTS

| | | |
|---|---|---|
| CN | 101633788 A | 1/2010 |
| CN | 101747650 A | 6/2010 |
| CN | 102286209 A | 12/2011 |
| CN | 103741125 A | 4/2014 |
| JP | H 4-180984 A | 6/1992 |
| WO | WO 03-033573 A1 | 4/2003 |
| WO | WO 2015/039572 A1 | 3/2015 |

OTHER PUBLICATIONS

Etheredge (Synthesis and Characterization of a New Quasi-One-Dimensional Copper (II) Phosphate, Ba2Cu(PO4)2. Inorg. Chem. 1996, 35, pp. 1474-1477).*

P. Nandha Kumar et al., Synthesis, Structural Analysis and Fabrication of Coatings of the $Cu^{2+}$ Co-Substitutions in $\beta$-$Ca_3(PO_4)_2$, Royal Society of Chemistry, Sep. 3, 2013, pp. 22469-22479, vol. 3, RSC Advances.

R. Nath et al., Study of One-Dimensional Nature of S=1/2 $(SR,BA)_2CU(PO_4)_2$ and $BaCuP_2O_7$ via $^{31}P$ NMR, The American Physical Society, May 31, 2005, pp. 174436-1-174436-11, Issue 71, Physical Review.

Nath, R. et al., "Study of one-dimensional nature of S = 1 / 2 $(Sr,Ba)_2Cu(PO_4)_2$ and $BaCuP_2O_7$ via $^{31}P$ NMR," Physical Review B, vol. 71, Iss. 17, 174436, May 31, 2005.

PCT International Search Report and Written Opinion dated Dec. 23, 2014, issued in corresponding International Application No. PCT/CN2014/086022 (11 pages).

* cited by examiner

*Primary Examiner* — Brieann R Johnston

(57) ABSTRACT

Embodiments of the present disclosure are directed to a polymer article. The polymer article includes a polymer matrix and a metal compound dispersed in the polymer matrix. The metal compound is a compound represented by formula (I): $A_xCu_y(PO_4)_2$ (I). In formula (I), A represents at least one element selected from Group IIA of the periodic table of elements, x/y=0.1 to 20, x+y=3.

8 Claims, No Drawings

POLYMER ARTICLES, INK COMPOSITIONS, AND METHODS FOR SELECTIVELY METALIZING POLYMER ARTICLES

CROSS-REFERENCE TO RELATED APPLICATIONS

This application is a continuation of International Application No. PCT/CN2014/086022, filed Sep. 5, 2014, which claims priority to and benefits of Chinese Patent Application No. 201310425978.8, filed with the State Intellectual Property Office of P. R. China on Sep. 17, 2013. The entire contents of the above-referenced applications are incorporated herein by reference in their entirety.

TECHNICAL FIELD

The present disclosure relates to polymer articles, ink compositions, methods for selectively metalizing a polymer article and/or insulating substrates.

BACKGROUND

A metal layer formed on a surface of a polymer article for transmitting electromagnetic signals is typically used in the fields of automobiles, manufacturing computers, communications, etc. Selectively forming the metal layer on the surface of the polymer article is a key step in a process of manufacturing such polymer articles.

For example, to form a metal layer, U.S. Patent Application Publication No. 2004/0241422 A1 discloses a method that adds inorganic compound powders having spinel structures to a polymer matrix. The inorganic compound powder may include an inorganic compound that contains elements such as copper, nickel, cobalt, chromium, iron, etc. The method then activates the inorganic compound power using a ultraviolet laser (with a wavelength of 248 nm, 308 nm, 355 nm, or 532 nm) or an infrared laser (with a wavelength of 1064 nm, or 10600 nm). This U.S. Patent Application Publication No. 2004/0241422 A1 discloses that an oxide having a spinel structure may be reduced into metal simple substances under the impact of the laser, and that chemical deposition of metal may be induced using the metal simple substances as a crystal nucleus to form a metal layer. The realization of such a procedure needs strict process control and high laser energy for reducing the oxide having the spinel structure into metal simple substances so as to induce the metal chemical deposition, which increases the requirements for the equipment and processes.

SUMMARY

Embodiments of the present disclosure seek to solve at least one of the problems set forth above and/or other problems of existing methods for forming a metal layer and/or metalizing a polymer article.

Embodiments of a first aspect of the present disclosure provide a polymer article. The polymer article may include a polymer matrix and at least one metal compound dispersed in the polymer matrix. The at least one metallic compound is a compound represented by formula (I), $$A_xCu_y(PO_4)_2 \quad (I),$$

wherein in formula (I), A represents at least one element selected from Group IIA of the periodic table of elements, $x/y=0.1$ to 20, $x+y=3$.

Embodiments of a second aspect of the present disclosure provide an ink composition. The ink composition may include at least one metal compound and at least one binder. The at least one metal compound is a compound represented by formula (I), $$A_xCu_y(PO_4)_2 \quad (I),$$

wherein in formula (I), A represents at least one element selected from Group IIA of the periodic table of elements, $x/y=0.1$ to 20, $x+y=3$.

Embodiments of a third aspect of the present disclosure provide a method for selectively metalizing a polymer article. The method may include the steps of: irradiating at least a selected part of a surface of the polymer article to be metalized with an energy beam; and performing chemical plating on the irradiated part of the polymer article. The polymer article may include a polymer matrix and at least one metal compound dispersed in the polymer matrix, wherein the at least one metal compound is a compound represented by formula (I), $$A_xCu_y(PO_4)_2 \quad (I),$$

wherein in formula (I), A represents at least one element selected from Group IIA of the periodic table of elements, $x/y=0.1$ to 20, $x+y=3$.

Embodiments of a fourth aspect of the present disclosure provide a method for selectively metalizing an insulating substrate. The method may include steps of: mixing at least one metal compound and at least one binder to obtain an ink composition, applying the ink composition on at least one part of a surface of the insulating substrate to be metalized to form an ink layer, and performing chemical plating on the at least one part of the insulating substrate having the ink layer to plate at least one metal layer on the ink layer. The at least one metal compound is a compound represented by formula (I), $$A_xCu_y(PO_4)_2 \quad (I),$$

wherein in formula (I), A represents at least one element selected from Group IIA of the periodic table of elements, $x/y=0.1$ to 20, $x+y=3$.

According to embodiments of the present disclosure, the at least one metal compound in the polymer article and/or the ink composition may be directly used as a chemical plating accelerator without reducing the at least one metal compound into metal simple substances. Therefore, selectively roughening the surface of the polymer article may allow selectively metalizing the surface of the polymer article by chemical plating; and/or selectively coating the surface of a substrate using the ink composition may allow the surface of the substrate to be selectively metalized by chemical plating. Moreover, when the surface of the polymer article is selectively irradiated using a laser to roughen the surface, the required amount of energy may be reduced because the at least one metal compound does not need to be reduced into metal simple substances. Gasifying the polymer using the laser to expose the at least one metal compound may allow and/or accelerating chemical plating so as to selectively metalize the selected part of the surface of the polymer article. Such process for selectively metalize the surface of the polymer article is relatively simple and has lower requirement on the energy of the energy source, e.g., the laser.

Furthermore, the color of the at least one metal compound used in the present disclosure is light, and thus the polymer article according to embodiments of the present disclosure may also have a light color. Additionally, the at least one metal compound can be obtained using a conventional method.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the present disclosure is not limited in its application to the details of construction and to the arrangements of the compositions and methods set forth in the following description. The present disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other articles, methods, and compositions for carrying out the several purposes of the present disclosure. It is important, therefore, to recognize that the claims should be regarded as including such equivalent constructions insofar as they do not depart from the spirit and scope of the present disclosure.

DETAILED DESCRIPTION

Reference will now be made in detail to the disclosed embodiments. The embodiments described herein with reference to examples are explanatory, illustrative, and used to generally understand the present disclosure. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. The disclosed embodiments shall not be construed to limit the present disclosure.

While the present disclosure is described herein with reference to illustrative embodiments of particular applications, such as articles, methods, and compositions for selectively metalizing the surface of a substrate, it is understood that the embodiments described herein are not limited thereto. Those having ordinary skill in the art and access to the teachings provided herein will recognize additional modifications, applications, embodiments, and substitution of equivalents that all fall within the scope of the present disclosure.

According to a first aspect of embodiments of the present disclosure, a polymer article is provided. The polymer article includes a polymer matrix and a metal compound dispersed in the polymer matrix, in which the metal compound is a compound represented by formula (I),

$$A_xCu_y(PO_4)_2 \quad (I).$$

In formula (I), A represents at least one element selected from Group IIA of the periodic table of elements. For example, A represents at least one element selected from a group consisting of Ca, Mg, Ba, Sr, or a combination thereof. In formula (I), x/y=0.1 to 20, x+y=3.

Examples of the metal compound may include, but are not limited to, $Cu_{2.7}Mg_{0.3}(PO_4)_2$, $Cu_{1.5}Mg_{1.5}(PO_4)_2$, $Cu_{1.5}Ba_{0.75}Sr_{0.75}(PO_4)_2$, $Cu_{0.15}Mg_{2.85}(PO_4)_2$, $Cu_{1.5}Ca_{1.5}(PO_4)_2$, $Cu_{0.15}Ca_{2.85}(PO_4)_2$, $Cu_2Ba(PO_4)_2$, $CuSr_2(PO_4)_2$, $Cu_{0.4}Sr_{2.6}(PO_4)_2$, or a combination thereof.

The color of the metal compound is light green or light sky blue, for example, and thus the polymer article according to the present disclosure also may have a light color.

The metal compound may be obtained by sintering a mixture containing a Cu source, a Group IIA metal source, and a phosphate.

The Cu source may be CuO and/or a substance capable of forming CuO under a sintering condition. The substance capable of forming CuO under the sintering condition may be at least one of various copper salts, such as copper salts of inorganic acids and/or copper salts of organic acids. Examples of the substance capable of forming CuO under the sintering condition may include, but are not limited to, cupric oxalate and/or copper carbonate.

The Group IIA metal source may be a Group IIA metal oxide and/or a compound capable of forming a Group IIA metal oxide under a sintering condition. The compound capable of forming the Group IIA metal oxide under the sintering condition may be Group IIA metal salts of organic acids and/or Group IIA metal salts of inorganic acids, for example, Group IIA metal salts of carbonic acid and/or Group IIA metal salts of oxalic acid. Examples of the Group IIA metal source may include, but are not limited to, magnesium oxide, magnesium carbonate, magnesium oxalate, calcium oxide, calcium carbonate, calcium oxalate, strontium oxide, strontium carbonate, barium oxide, barium carbonate, barium oxalate, or a combination thereof.

The phosphate may be various commonly used metal salts of phosphoric acid and/or ammonium salts of phosphoric acid. Examples of the phosphate may include, but are not limited to, diammonium hydrogen phosphate and/or ammonium dihydrogen phosphate.

The relative amount of the Cu source, the Group IIA metal source, and the phosphate is such that the content of various elements in the finally obtained metal compound satisfies the above-described requirement.

The sintering may be performed using a single-stage sintering process or a two-stage sintering process. In some embodiments, the single-stage sintering process includes sintering a mixture containing the Cu source, the Group IIA metal source, and the phosphate at a temperature ranging from about 900° C. to about 1000° C. for a period of time, e.g., ranging from about 10 hours to about 20 hours, and grinding the obtained sintering product. In other embodiments, the two-stage sintering process includes: sintering a mixture of the Cu source, the Group IIA metal source, and the phosphate at a temperature ranging from about 600° C. to about 900° C. for a period of time, e.g., ranging from about 2 hours to about 10 hours, then grinding the obtained solid substance from the sintering, and then sintering the grinded substance at a temperature ranging from about 900° C. to about 1000° C. for a period of time, e.g., ranging from about 10 hours to 20 hours. In some embodiments, when the molar ratio of the Group IIA metal to Cu in the mixture is less than 1, the sintering is performed at a temperature ranging from about 900° C. to about 950° C. for a period of time, e.g., ranging from about 10 hours to about 20 hours, in either the single-stage sintering process or the two-stage sintering process.

The mixture containing the Cu source, the Group IIA metal source, and the phosphate may be obtained by grinding the mixture of the Cu source, the Group IIA metal source, and the phosphate.

The grinding may be dry grinding, wet grinding, or semi-dry grinding. In some embodiments, wet grinding or semi-dry grinding is used. A dispersing agent for the wet grinding may be selected from various commonly used dispersing agents that are suitable for metal oxides. For example, the dispersing agent may be water and/or anhydrous ethanol. The amount of the dispersing agent may be any suitable amount.

The content of the metal compound in the polymer article may be selected suitably according to the function of the metal compound in the polymer article. For example, when the metal compound in polymer article is used as a chemical plating accelerator for selectively metalizing a surface of the polymer article, based on the total weight of the polymer article, the content of the metal compound may range from about 1 wt % to about 40 wt %, e.g., from about 10 wt % to about 20 wt %, from about 10 wt % to about 30 wt %, or from about 10 wt % to about 40 wt %.

The polymer article may be prepared using a commonly used polymer molding method. In one embodiment, the polymer article may be obtained by mixing a polymer matrix component with a metal compound substantially uniformly, and by molding the obtained mixture.

The polymer matrix component may refer to a component for forming the polymer matrix, which may include a polymer and an optional additive.

The polymer may be suitably selected according to the application of the polymer article. For example, the polymer article may be formed from a thermoplastic polymer and/or a thermoset polymer. The polymer may be a material including a plastic, a rubber, and/or fiber. Examples of the polymer may include, but are not limited to, polyolefin, such as polystyrene, polypropylene, poly(methyl methacrylate), and poly(acrylonitrile-butadiene-styrene); polycarbonate; polyesters, such as poly(1,4-cyclohexylenedimethylene terephthalate), poly(diallyl isophthalate), poly(diallyl terephthalate), poly(butylene naphthalate), poly(ethylene terephthalate), and poly(butylene terephthalate); polyamides, such as poly(hexamethylene adipamide), poly(hexamethylene azelamide), poly(hexamethylene succinamide), poly(hexamethylene lauramide), poly(hexamethylene sebacamide), poly(decamethylene sebacamide), poly(undecanoic amide), poly(lauramide), poly(octanamide), poly(9-aminononanoic acid), polycaprolactam, poly(phenylene terephthalamide), poly(hexamethylene isophthalamide), poly(hexamethylene terephthalamide), and poly(nonamethylene terephthalamide); poly(aromatic ether); polyether imide; polycarbonate/(acrylonitrile-butadiene-styrene) alloy; polyphenylene oxide; polyphenylene sulphide; polyimide; polysulfone; poly(ether-ether-ketone); polybenzimidazole; phenol formaldehyde resin; urea formaldehyde resin; melamine-formaldehyde resin; epoxy resin; alkyd resin; polyurethane; or a combination thereof.

The additive may be a substance that may improve the property of the polymer article and/or give the polymer article a new property. The additive may be, for example, a filler, an antioxidant, and/or a light stabilizer. The content of the additive may be suitably selected according to the type and the application requirements of the additive. For example, the content of the filler, may be about 1 weight part to about 40 weight parts, the content of the antioxidant may be about 0.01 weight parts to about 1 weight part, the content of the light stabilizer may be about 0.01 weight parts to about 1 weight part with respect to 100 weight parts of the polymer.

The filler may be a filler that is physically and/or chemically non-reactive under the activation of the laser. For example, the filler may include talcum powder and/or calcium carbonate. Glass fiber is insensitive to laser, but adding glass fiber as the filler may greatly enlarge the depth of a recess of the plastic matrix that may be formed after laser activation, which may benefit copper deposition during the chemical copper plating. The filler may also be an inorganic filler that is reactive under the activation of the laser. For example, the inorganic filler may be a tin oxide, e.g., a nano-tin oxide, which may increase the usage rate of the energy of an infrared laser when stripping the plastic surface. For another example, a functional filler, such as carbon black, which also may increase absorption of the energy of the infrared laser by the plastic and increase the degree of stripping of the plastic. The filler may also be at least one selected from a group consisting of glass microbeads, calcium sulfate, barium sulfate, titanium dioxide, pearl powder, wollastonite, siliceous earth, kaolin, coal powder, pot clay, mica, oil shale ash, aluminium silicate, aluminium oxide, carbon fiber, silicon dioxide, zinc oxide, or a combination thereof.

The antioxidant may improve the antioxygenic property of the polymer article, thus improving the useful life of the article. The antioxidant may be selected from various commonly used antioxidants in the polymer field. For example, the antioxidant may contain a primary antioxidant and a secondary antioxidant. The ratio between the primary antioxidant and the secondary antioxidant may be selected suitably according to the type of the antioxidant. The weight ratio of the primary antioxidant to the secondary antioxidant may range from about 1:1 to about 1:4. The primary antioxidant may be a hindered phenol type antioxidant. Examples of the primary antioxidant may include, but are not limited to, antioxidant 1098 and antioxidant 1010, in which the main component of the antioxidant 1098 is 3,3'-bis(3,5-di-tert-butyl-4-hydroxyphenyl)-N,N'-hexamethylenedipropionamide, and the main component of the antioxidant 1010 is pentaerythritol tetrakis(3-(3,5-di-tert-butyl-4-hydroxyphenyl)propionate). The secondary antioxidant may be a phosphite type antioxidant. Examples of the secondary antioxidant may include, but are not limited to, antioxidant 168, in which the main component of the antioxidant 168 is tris(2,4-di-tert-butyl-pheny)phosphite.

The light stabilizer may be selected from various well-known light stabilizers. For example, the light stabilizer may be a hindered amine type light stabilizer. Examples of the light stabilizer may include, but are not limited to, bis(2,2,6,6-tetramethyl-4-piperidyl)sebacate.

The additive also may comprise various substances, such as a lubricant, which may be able to improve the processability of the polymer matrix. The lubricant may be selected from various substances, which may improve the flowability of the polymer in a melted state. For example, the lubricant may be selected from a group consisting of ethylene/vinyl acetate copolymer (EVA wax), polyethylene wax (PE wax), stearate, or a combination thereof. The content of the lubricant may range from about 0.01 weight parts to 1 weight part with respect to 100 weight parts of the polymer.

The size of the particles in the metal compound may be selected according to the molding method to form a compact polymer article. For example, the average volume diameter of the particles of the metal compound may range from about 0.1 μm to about 5 μm, e.g., from about 0.4 μm to about 2 μm.

The molding method may be selected from various commonly used molding methods in the polymer molding field, for example, injection molding or extrusion molding.

According to the second aspect of the embodiments of the present disclosure, an ink composition is provided. The ink composition may include at least one metal compound and at least one binder, in which the represents at least one metal compound is a compound represented by formula (I),

$$A_xCu_y(PO_4)_2 \tag{I}$$

In formula (I), A represents at least one element selected from Group IIA of the periodic table of elements, and x/y=0.1 to 20, x+y=3.

Exemplary embodiments of the metal compound and the method for preparing the metal compound have been described above in detail, thus a detailed description of the metal compound is omitted herein.

The size of the particles of the metal compound may be determined such that it is possible to ensure that the finally formed ink composition may form a substantially uniform ink layer. For example, the average volume diameter of the particles of the metal compound may range from about 20 nm to about 500 nm.

The ink composition may further include at least one binder. When the ink composition is applied on the surface of an insulating substrate, the binder may have the function of facilitating dispersing the metal compound substantially uniformly on the surface of the insulating substrate, and may then facilitate the metal compound to form a film having a suitable strength and/or a suitable degree of adhesion to the insulating substrate.

Any suitable type of binder that can perform the above-describe functions may be used. In some embodiments, the binder may be an organic adhesive. For example, the binder may be selected from a group consisting of cellulose acetate, a polyacrylate resin, ethylene vinyl acetate copolymer, polyvinyl alcohol, polyvinyl acetal, polyvinyl acetate, polyvinylpyrrolidone, polyphosphonic acid, or a combination thereof.

In some embodiments, in the ink composition, the binder may be selected from CAB series cellulose acetate butyrates (e.g., cellulose acetate butyrates under the trade names of CAB381-0.5, CAB381-20, CAB551-0.2, and CAB381-2) commercially available from Eastman Chemical Company of the United States, and Mowital series polyvinyl butyrals (e.g., polyvinyl butyrals under the trade names of Mowital B 60T, Mowital B 75H and Mowital B 60H) commercially available from Kuraray Co., Ltd. of Japan.

In the ink composition, the relative proportion between the binder and the metal compound is predetermined such that the metal compound is substantially uniformly dispersed on the surface of the insulating substrate so as to form an ink layer having a suitable strength and having a suitable degree of adhesion to the insulating substrate, and to plate a metal layer on the ink layer. For example, in the ink composition, with respect to 100 weight parts of the metal compound, the amount of the binder may range from about 1 weight part to about 60 weight parts, e.g., from about 15 weight parts to about 30 weight parts.

In order to further improve the dispersion uniformity of the metal compound in the binder and to increase the uniformity of the film on the surface of the insulating substrate, the ink composition may include a solvent. Any suitable type of solvent may be used. In some embodiments, the solvent may include at least one component suitably selected from a group consisting of water, $C_1$-$C_{12}$ alcohols, $C_3$-$C_{12}$ ketones, $C_6$-$C_{12}$ aromatic hydrocarbons, $C_1$-$C_{12}$ haloalkanes, and $C_2$-$C_{12}$ haloolefins, or a combination thereof. For example, the solvent may include at least one suitably selected from a group consisting of methanol, ethanol, n-propanol, isopropanol, n-butanol, tert-butanol, n-pentanol, n-hexanol, n-heptanol, n-octanol, acetone, 2-pentanone, 2-butanone, 3-methyl-2-pentanone, 2,3-butanedione, 2,3-pentanedione, 2,5-hexanedione, 1,3-cyclohexanedione, toluene, xylene, trichloroethene, or a combination thereof.

Any suitable amount of the solvent may be selected such that the metal compound may be substantially uniformly dispersed in the binder and a film may be substantially uniformly formed on the surface of the insulating substrate. In some embodiments, the amount of the solvent may be reduced without substantially affecting the function of the solvent. For example, with respect to 100 weight parts of the metal compound, the amount of the solvent may range from about 20 weight parts to about 200 weight parts, e.g., 20 weight parts to 100 weight parts.

According to the application of the ink composition, the ink composition may further include various commonly used additives in the ink field to give the ink composition desirable properties and/or functions. For example, the additive may include at least one selected from a group consisting of a dispersing agent, a defoamer, a leveling agent, a viscosity regulator, or a combination thereof. Any suitable amount of the additive may be used. For example, with respect to 100 weight parts of the metal compound, the total amount of the additive may range from about 0.1 weight parts to about 20 weight parts, e.g., from about 0.5 weight parts to about 10 weight parts.

In the ink composition, the dispersing agent may be used for shorting the time for dispersing the metal compound in the binder and the optional solvent, and thus improving the dispersion stability of the metal compound in the binder and the optional solvent. The dispersing agent may be selected from various commonly used substances in the art that have the above-mentioned function. In some embodiments, the dispersing agent may be an organic dispersing agent, e.g., an aliphatic amine dispersing agent, an alcohol amine dispersing agent, a cyclic unsaturated amine dispersing agent, a fatty acid dispersing agent, an aliphatic amide dispersing agent, an ester dispersing agent, a paraffin dispersing agent, a phosphate dispersing agent, a polymer dispersing agent (e.g., a polyacrylate dispersing agent and a polyester dispersing agent), and/or an organic phosphine dispersing agent.

In the ink composition, the dispersing agent may be selected from various commercially available dispersing agents commonly used in the art. For example, the dispersing agent may include at least one selected from a group consisting of: dispersing agents under the trade names of ANTI-TERRA-U, ANTI-TERRA-U80, ANTI-TERRA-U100, DISPERBYK-101, DISPERBYK-130, BYK-220S, LACTIMON, LACTIMON-WS, BYK-W966, DISPERBYK, BYK-154, BYK-9076, DISPERBYK-108, DISPERBYK-109, DISPERBYK-110, DISPERBYK-102, DISPERBYK-111, DISPERBYK-180, DISPERBYK-106, DISPERBYK-187, DISPERBYK-181, DISPERBYK-140, DISPERBYK-142, DISPERBYK-145, DISPERBYK-115, DISPERBYK-160, DISPERBYK-161, DISPERBYK-162, DISPERBYK-163, DISPERBYK-164, DISPERBYK-165, DISPERBYK-166, DISPERBYK-167, DISPERBYK-182, DISPERBYK-183, DISPERBYK-184, DISPERBYK-185, DISPERBYK-168, DISPERBYK-169, DISPERBYK-170, DISPERBYK-171, DISPERBYK-174, DISPERBYK-190, DISPERBYK-2150, BYK-9077, DISPERBYK-112, DISPERBYK-116, DISPERBYK-191, DISPERBYK-192, DISPERBYK-2000, DISPERBYK-2001, DISPERBYK-2010, DISPERBYK-2020, DISPERBYK-2025, DISPERBYK- 2050, and DISPERBYK-2070, commercially available from BYK company of Germany; a dispersing agent under the trade name of PHOSPHOLAN PS-236 commercially available from Akzo Nobel company of Netherland; a dispersing agent under the trade name of PS-21A commercially available from Witco Chemical Corporation of the United States; the Hypermer KD series dispersing agents and the Zephrym PD series dispersing agents commercially available from Croda company of England; or a combination thereof.

Any suitable amount of the dispersing agent may be used. For example, with respect to 100 weight parts of the metal compound, the amount of the dispersing agent may range from about 0.1 weight parts to about 4 weight parts.

In the ink composition, the defoamer may be selected from various commonly used substances in the art, which may suppress the formation of foams, destroy the formed foams, and/or discharge the formed foams from the system. For example, the defoamer may be an organic polysiloxane defoamer, a polyether defoamer, and/or a higher alcohol defoamer.

In the ink composition, the defoamer may be selected from various commercially available defoamer commonly used in the art. For example, the defoamer may include at least one selected from a group consisting of defoamers under the trade names of BYK-051, BYK-052, BYK-053, BYK-055, BYK-057, BYK-020, BYK-065, BYK-066N, BYK-067A, BYK-070, BYK-080A, BYK-088, BYK-141, BYK-019, BYK-021, BYK-022, BYK-023, BYK-024, BYK-025, BYK-028, BYK-011, BYK-031, BYK-032, BYK-033, BYK-034, BYK-035, BYK-036, BYK-037, BYK-038, BYK-045, BYK-A530, BYK-A555, BYK-071, BYK-060, BYK-018, BYK-044, BYK-094, or a combination thereof, commercially available from BYK company of Germany.

Any suitable amount of the defoamer may be used. For example, with respect to 100 weight parts of the metal compound, the amount of the defoamer may range from about 0.1 weight parts to about 3 weight parts.

In the ink composition, the leveling agent is used for enabling the ink composition to form a more flat, smooth, and uniform film during a drying process. Any suitable type of the leveling agent may be used, and the leveling agent may be a commonly used substance that has the above-mentioned function in the art. For example, the leveling agent may include at least one selected from a group consisting of a polyacrylate leveling agent, a polydimethylsiloxane leveling agent, a polymethyl phenyl siloxane leveling agent, a fluorine-containing surfactant, or a combination thereof.

In the ink composition, the leveling agent may be selected from various commercially available leveling agents commonly used in the art. For example, the leveling agent may be selected from a group consisting of leveling agents under the trade names of BYK-333, BYK-306, BYK-358N, BYK-310, BYK-354, BYK-356, or a combination thereof, commercially available from BYK company of Germany.

Any suitable amount of the leveling agent may be used. For example, with respect to 100 weight parts of the metal compound, the amount of the leveling agent may range from about 0.3 weight parts to about 4 weight parts.

In the ink composition, the viscosity regulator may be used for adjusting the viscosity of the ink composition. Any suitable type of the viscosity regulator may be used. For example, the viscosity regulator may include at least one selected from a group consisting of fumed silica, polyamide wax, organic bentonite, hydrogenated castor oil, metallic soap, hydroxyalkyl celluloses and derivatives thereof, polyvinyl alcohol, and polyacrylate, or a combination thereof.

Any suitable amount of the viscosity regulator may be used. For example, with respect to 100 weight parts of the metal compound, the amount of the viscosity regulator may range from about 0.3 weight parts to about 3 weight parts.

In one embodiment, the ink composition contains the metal compound, the binder, a solvent, a dispersing agent, a defoamer, a leveling agent, and a viscosity regulator. With respect to 100 weight parts of the metal compound, the amount of the binder may range from about 1 weight part to about 30 weight parts, the amount of the solvent may range from about 20 weight parts to about 200 weight parts, the amount of the dispersing agent may range from about 0.4 weight parts to about 4 weight parts, the amount of the defoamer may range from about 0.1 weight parts to about 3 weight parts, the amount of the leveling agent may range from about 0.3 weight parts to about 4 weight parts, and the amount of the viscosity regulator may range from about 0.3 weight parts to about 3 weight parts.

Any suitable method may be used for preparing the ink composition, as long as the metal compound and the binder as well as the optional solvent and additive may be mixed substantially uniformly. For example, the ink composition may be obtained by mixing the metal compound with the binder as well as the optional solvent and additive uniformly in a mixer such as a planet-type ball mill. In the mixer, the method and the conditions for mixing individual components uniformly are known in the art, and thus are not described herein.

The ink composition according to embodiments of the present disclosure can be applied on the surface of the insulating (i.e., nonconductive) substrate, and chemical plating may then be performed on the surface of the insulating substrate. This thus allows selectively metalizing the surface of the insulating substrate and consequently forming a signal transmission pathway on the surface of the insulating or nonconductive substrate.

According to a third aspect of the embodiments of the present disclosure, a method for selectively metalizing a polymer article is provided. The method may include steps of: irradiating a surface of the polymer article to be metalized with an energy beam, and performing chemical plating on the irradiated polymer article, in which the polymer article is the above-described polymer article.

The polymer article and the method for preparing the same have been described above in detail, and are thus not further described herein.

The energy beam may be selected from various energy beams, which may gasify the polymer. For example, the energy beam may be a laser, an electron beam, or an ion beam.

The irradiating condition of the energy beam may be determined such that the polymer material on the surface of the polymer article is gasified to expose the metal compound. The irradiating condition of the energy beam may suitably be selected according to the type of the polymer material and the type of the energy beam. In some embodiments, when the surface of the polymer article is selectively irradiated with energy beam, the polymer material on the surface is gasified to expose the metal compound so as to perform chemical plating directly to (i.e., metalize) the selected surface of the polymer article. This process reduces the energy typically needed for reducing the metal compound to metal simple substances. Thus the process is simple and requires less energy.

In some embodiments, when a laser is used as the energy beam, the laser may have a wavelength ranging from about 157 nm to about 10.6 μm, a scanning speed ranging from about 500 mm/s to about 8000 mm/s, a scanning step ranging from about 3 μm to about 9 μm, a delay period ranging from about 30 μs to about 100 μs, a frequency ranging from about 30 kHz to about 40 kHz, a power ranging from about 3 kW to about 4 kW, and/or a filling gap ranging from about 10 μm to about 50 μm. By irradiating the surface of the polymer article with the laser, the polymer article may be etched and the etched thickness of the polymer article may range from about a few microns to about tens of microns, thus exposing the catalyst component particles (i.e., particles of the metal compound) in the polymer article and microscopically forming a rough surface having uneven porous structure on at least part of the surface of the polymer article. In the subsequent chemical plating procedure, the metal particles are embedded into the pores and/or spaces in the rough surface, thus forming very strong binding force with the plastic sample, i.e., polymer article.

The method of performing chemical plating on the polymer article on which catalyst component particles are exposed is known to a person skilled in the art. For example, when performing chemical copper plating, the method may include contacting the etched polymer article with a copper plating solution. The copper plating solution may include a copper salt and a reducing agent. The pH value of the copper plating solution may range from about 12 to about 13. The reducing agent may reduce copper ions in the copper salt into copper simple substances. The reducing agent, for example, may be selected from a group consisting of glyoxylic acid, hydrazine, sodium hypophosphite, or a combination thereof.

After chemical plating is performed, electroplating may be performed or the chemical plating may be performed for one or more times to further increase the thickness of the plated metal layer or to form other metal layers on the chemically plated layer. For example, after chemical copper plating is completed, one nickel layer may be formed by chemical plating to prevent the surface of the plated copper layer from being oxidized.

According to a fourth aspect of the embodiments of the present disclosure, a method for selectively metalizing an insulating substrate is provided. The method may include steps of: mixing at least one metal compound and at least one binder to obtain an ink composition, applying the ink composition on a surface of the insulating substrate to be metalized to form an ink layer, and performing chemical plating on the insulating substrate having the ink layer to plate at least one metal layer on the ink layer. The at least one metal compound is a compound represented by formula (I),

$$A_xCu_y(PO_4)_2 \qquad (I).$$

In formula (I), A represents at least one element selected from Group IIA of the periodic table of elements, x/y=0.1 to 20, x+y=3.

The ink composition and the method for preparing the same are described above in detail, and are thus not described herein.

Various commonly used methods may be used for applying the ink composition on the surface of the insulating substrate. For example, the ink composition may be applied on the surface of the insulating substrate to be metalized by a method selected from a group consisting of screen printing, spray coating, laser printing, ink jet printing, pad printing, gravure printing, letterpress printing, and lithographic printing. Operating steps and conditions of screen printing, spray coating, laser printing, ink jet printing, pad printing, gravure printing, letterpress printing, and lithographic printing are known in the art, and are thus not described herein. In some embodiments, the ink composition is applied on the surface of the insulating substrate to be metalized by ink jet printing or laser printing.

After applying the ink composition on the surface of the insulating substrate, the method according to embodiments of the present disclosure may further include a step of drying the substrate applied with the ink composition. Any suitable drying method may be used, and the drying method may be suitably selected according to the types of the binder as well as the optional solvent in the ink composition. For example, the drying may be performed at a temperature ranging from about 40° C. to about 150° C. for a period of time ranging from about 0.5 hour to about 5 hours. The drying step may be performed under the normal atmospheric pressure, or may be performed under a reduced pressure.

The thickness of the ink layer, i.e., the layer of the ink composition applied on the surface of the insulating substrate, may be suitably selected according to the constituents of the ink composition such that chemical plating may be performed on the surface of the insulating substrate to metalize a selected surface or a selected area of the surface of the insulating substrate. In some instances, the thickness of the ink layer may range from about 8 μm to about 50 μm. In other instances, the thickness of the ink layer may range from about 12 μm to about 40 μm. In other instances, the thickness of the ink layer may range from about 12 μm to about 25 μm.

In some embodiments, when chemical copper plating is performed, the method may include contacting the insulating substrate having the ink layer with a copper plating solution. The copper plating solution may include a copper salt and a reducing agent. The pH value of the copper plating solution may range from about 12 to about 13. The reducing agent may reduce copper ions in the copper salt into copper simple substances. For example, the reducing agent may be selected from a group consisting of glyoxylic acid, hydrazine, sodium hypophosphite, or a combination thereof.

After chemical plating is performed, electroplating may be performed or the chemical plating may be performed for one or more times to increase the thickness of the plated metal layer or to form other metal layers on the chemically plated layer. For example, after chemical copper plating is completed, one nickel layer may be formed by chemical plating to prevent the surface of the plated copper layer from being oxidized.

In order to further improve the adhesion of the metal layer formed by chemical plating as well as the plating speed, before performing the chemical plating on the insulating substrate having the ink layer applied thereon, the method according to the fourth aspect of the embodiments of the present disclosure may further include irradiating at least a selected part the surface of the ink layer using an energy beam to gasify at least the irradiated part of the surface of the ink layer.

The energy beam may be a laser, an electron beam, or an ion beam. The irradiating condition of the energy beam is such that the surface of the ink layer may be gasified. For example, when the energy beam is a laser, the laser may have a wavelength ranging from about 157 nm to about 10.6 μm, a scanning speed ranging from about 500 mm/s to about 8000 mm/s, a scanning step ranging from about 3 μm to about 9 μm, a delay time ranging from about 30 μs to about 100 μs, a frequency ranging from about 30 kHz to about 40 kHz, a power ranging from about 3 kW to about 4 kW, and a filling gap ranging from about 10 μm to about 50 μm.

The method according to embodiments of the present disclosure may perform selective metalizing on various insulating substrates. The insulating substrate, for example, may be a plastic substrate, a rubber substrate, a fiber substrate, a coating formed by a coating material, a ceramic substrate, a glass substrate, a wooden substrate, a cement substrate, or paper. For example, the insulating substrate is a plastic substrate or a ceramic substrate. When the insulating substrate is a flexible plastic substrate (e.g., polyethylene glycol terephthalate, polyimide, polycarbonate, polyether ketone, poly(ether-ether-ketone), or liquid crystal polymer), the article obtained by applying the ink composition on the surface of the substrate and selectively metalizing the surface of the substrate is suitable for preparing a flexible circuit board.

The present disclosure will be described in detail below with reference to Examples and Comparative Examples.

In the following Examples and Comparative Examples, the composition of the metal compound was measured by a technical called inductively coupled plasma-atomic emission spectrometry (ICP-AES).

In the following Examples and Comparative Examples, the average volume diameter of the particles was measured by a Laser Particle Sizer commercially available from Chengdu Jingxin Powder Analysis Instrument Co., Ltd., China.

In the following Examples and Comparative Examples, the adhesion of the metal layer formed on the surface of the substrate was measured by a cross-cut process.

Specifically, a surface of a sample to be measured was cut using a cross-cut knife to form a grid comprising 100 test regions (each region was 1 mm×1 mm). A gap between adjacent grids was formed to reach the bottom of the metal layer. Debris in a test region was cleaned using a brush, and then an adhesive tape (3M600 gummed paper) was attached to grids in the test region. One end of the attached adhesive paper was rapidly torn off in a vertical direction. Two identical tests were performed on the same grid region. The result of the adhesion was determined according to the following standard.

ISO Grade 0: the cut edge is smooth and neither the metal layers at the cut edge nor the metal layers at the cut intersection of the grid is peeled off.

ISO Grade 1: the metal layers at the cut intersection are partially peeled off, but no more than 5% (area percentage) of the metal layers are peeled off.

ISO Grade 2: the metal layers both at the cut edge and the cut intersection are partially peeled off, and 5% to 15% (area percentage) of the metal layers are peeled off.

ISO Grade 3: the metal layers at both the cut edge and the cut intersection are partially peeled off, and 15% to 35% (area percentage) of the metal layers are peeled off.

ISO Grade 4: the metal layers at both the cut edge and the cut intersection are partially peeled off, and 35% to 65% (area percentage) of the metal layers are peeled off.

ISO Grade 5: the metal layers at both the cut edge and the cut intersection are partially peeled off, and more than 65% (area percentage) of the metal layers peel off.

Examples 1 to 4 below are used for describing exemplary polymer articles and the methods for selectively metalizing the polymer articles.

Example 1

(1) Preparation of a Metal Compound

CuO, $MgCO_3$ and $NH_4H_2PO_4$ were mixed uniformly, in which the molar ratio between the CuO, $MgCO_3$ and $NH_4H_2PO_4$ was 2.7:0.3:2. Then, wet grinding was performed for the obtained mixture on a grinding mill, in which the dispersing agent was anhydrous ethanol. With respect to 100 weight parts of the mixture, the amount of anhydrous ethanol was 150 weight parts. The grinding was performed at a rotating speed of 500 rpm for 5 hours.

The obtained powder was put in an oven and dried in an air atmosphere at a temperature of 80° C. for 12 hours.

The dried powder was placed in a muffle furnace and sintered in an air atmosphere at a temperature of 900° C. for 2 hours. Then, dry grinding was performed for the sintered product. Then, the obtained powder from the dry grinding was placed in the muffle furnace and sintered in an air atmosphere at a temperature of 950° C. for 10 hours again, and then dry grinding was performed for the sintered product again, thus obtaining a metal compound having particles with an average volume diameter of 2 μm. The analysis result by ICP-AES showed that the formula of the metal compound was $Cu_{2.7}Mg_{0.3}(PO_4)_2$. The metal compound showed a light sky blue color with a hexadecimal color code (i.e., HEX format) of #87CEFA, and a RGB color model (i.e., RGB format) of (135, 206, 250).

(2) Formation of a Polymer Sheet

Polycarbonate, antioxidant 1098, lubricant PE wax, and the metal compound prepared in step (1) were mixed. With respect to 100 weight parts of the polycarbonate, the amount of the metal compound was 10 weight parts, the amount of the antioxidant was 0.05 weight parts, and the amount of the lubricant was 0.04 weight parts. After the obtained mixture was pelleted, the pellets were fed into an injection molding machine to perform injection molding, thus obtaining a polymer sheet with a thickness of 2 mm.

(3) Irradiation and Chemical Plating

The polymer sheet obtained in step (2) was put on the sample stage of the laser device. Then the laser was focused on to the polymer sheet. The movement of the laser beam and/or the sample stage was controlled by a computer program. The laser device was Hans YLP-20 type laser device. The laser's parameters were as follows: the wavelength was 1064 nm, the scanning speed was 1000 mm/s, the scanning step was 6 μm, the delay time was 50 μs, the frequency was 30 kHz, the power was 4 kW, and the filling gap was 20 μm. After laser irradiation and/or etching, a decontamination process on the sample, i.e., the polymer sheet, was performed, and then the sample was placed in a plating solution to perform chemical plating, thus obtaining a plating layer with a thickness of 12 μm. The plating solution included 5 g/L copper sulfate pentahydrate, 25 g/L potassium sodium tartrate, 7 g/L sodium hydroxide, 10 g/L formaldehyde, and 0.1 g/L stabilizer.

The adhesion test result showed that the plating speed was 8 μm/h and the adhesion of the plating layer was ISO Grade 1.

Example 2

(1) Preparation of a Metal Compound

CuO, CaO, and $NH_4H_2PO_4$ were mixed uniformly, in which the molar ratio between the CuO, CaO, and $NH_4H_2PO_4$ was 1.5:1.5:2. Then, wet grinding was performed for the obtained mixture on a grinding mill, in which the dispersing agent was anhydrous ethanol. With respect to 100 weight parts of the mixture, the amount of anhydrous ethanol was 150 weight parts. The grinding was performed at a rotating speed of 500 rpm for 5 hours.

The obtained powder was placed in an oven, and the powder was dried in an air atmosphere at a temperature of 80° C. for 12 hours.

The dried powder was placed in the muffle furnace and sintered in an air atmosphere at a temperature of 1000° C. for 20 hours. Then, dry grinding was performed for the sintered product, thus obtaining a metal compound having particles with an average volume diameter of 1.5 µm. The analysis result by ICP-AES showed that the chemical formula of the metal compound was $Cu_{1.5}Ca_{1.5}(PO_4)_2$. The metal compound showed a light green color with a hexadecimal color code (i.e., HEX format) of #90EE90 and a RGB color model (i.e., RGB format) of (144, 238, 144).

(2) Formation of a Polymer Sheet

Polycarbonate, antioxidant 1098, lubricant PE wax and the metal compound prepared in step (1) were mixed. With respect to 100 weight parts of the polycarbonate, the amount of the metal compound was 20 weight parts, the amount of the antioxidant was 0.05 weight parts, and the amount of the lubricant was 0.04 weight parts. After the obtained mixture was pelleted, the pellets were fed into an injection molding machine to perform injection molding, thus obtaining a polymer sheet with a thickness of 4 mm.

(3) Irradiation and Chemical Plating

The polymer sheet obtained in step (2) was placed on the sample stage of the laser device, then the laser was focused onto the polymer sheet. The movement of the laser beam and/or the sample stage was controlled by a computer program. The laser device was Hans YLP-20 type laser device. The laser's parameters were as follows: the wavelength was 1064 nm, the scanning speed was 1000 mm/s, the scanning step was 6 µm, the delay time was 50 µs, the frequency was 30 kHz, the power was 4 kW, and the filling gap was 20 µm. After laser irradiation and/or etching, a decontamination process was performed for the plastic sample, i.e., the polymer sheet, and then the plastic sample was placed in a plating solution to perform chemical plating, thus obtaining a plating layer with a thickness of 10 µm. The plating solution included 5 g/L copper sulfate pentahydrate, 25 g/L potassium sodium tartrate, 7 g/L sodium hydroxide, 10 g/L formaldehyde, and 0.1 g/L stabilizer.

The adhesion test result showed that the plating speed was 6 µm/h and the adhesion of the plating layer was ISO Grade 1.

Example 3

(1) Preparation of a Metal Compound

CuO, $BaCO_3$, $SrCO_3$, and $NH_4H_2PO_4$ were mixed uniformly, in which the molar ratio between the CuO, $BaCO_3$, $SrCO_3$, and $NH_4H_2PO_4$ was 1.5:0.75:0.75:2. Then, wet grinding was performed for the obtained mixture on a grinding mill, in which the dispersing agent was anhydrous ethanol. With respect to 100 weight parts of the mixture, the amount of anhydrous ethanol was 150 weight parts. The grinding was performed at a rotating speed of 500 rpm for 5 hours.

The obtained powder was placed in an oven, and the powder was dried in an air atmosphere at a temperature of 80° C. for 12 hours.

The dried powder was placed in the muffle furnace and sintered in an air atmosphere at a temperature of 600° C. for 10 hours. Then, dry grinding was performed for the sinter, thus obtaining a metal compound. Then, the obtained powder was placed in the muffle furnace and sintered in an air atmosphere at a temperature of 1000° C. for 15 hours again, thus obtaining a metal compound having particles with an volume average particle size of 2 µm. The analysis result by ICP-AES showed that the chemical formula of the metal compound was $Cu_{1.5}Ba_{0.75}Sr_{0.75}(PO_4)_2$. The metal compound showed a light green color with a hexadecimal color code (i.e., HEX format) of #90EE90 and a RGB color model (i.e., RGB format) of (144, 238, 144).

(2) Formation of a Polymer Sheet

Polycarbonate, antioxidant 1098, lubricant PE wax, and the metal compound prepared in step (1) were mixed. With respect to 100 weight parts of the polycarbonate, the amount of the metal compound was 30 weight parts, the amount of the antioxidant was 0.05 weight parts, and the amount of the lubricant was 0.04 weight parts. After the obtained mixture was pelleted, the pellets were fed into an injection molding machine to perform injection molding, thus obtaining a polymer sheet with a thickness of 2 mm.

(3) Irradiation and Chemical Plating

The polymer sheet obtained in step (2) was placed on the sample stage of the laser device, then the laser was focused onto the polymer sheet. The movement of the laser beam or the sample stage was controlled by a computer program. The laser device was Hans YLP-20 type laser device. The laser's parameters were set as follows: the wavelength was 1064 nm, the scanning speed was 1000 mm/s, the scanning step was 6 µm, the delay time was 50 µs, the frequency was 30 kHz, the power was 4 kW, and the filling gap was 20 µm. After laser irradiation and/or etching, a decontamination process was performed for the plastic sample, i.e., the polymer sheet, and then the plastic sample was placed in a plating solution to perform chemical plating, thus obtaining a plating layer with a thickness of 12 µm. The plating solution included 5 g/L copper sulfate pentahydrate, 25 g/L potassium sodium tartrate, 7 g/L sodium hydroxide, 10 g/L formaldehyde, and 0.1 g/L stabilizer.

The adhesion test result showed that the plating speed was 9 µm/h and the adhesion of the plating layer was ISO Grade 1.

Example 4

(1) Preparation of a Metal Compound

CuO, calcium oxalate, and $NH_4H_2PO_4$ were mixed uniformly, in which the molar ratio between the CuO, calcium oxalate, and $NH_4H_2PO_4$ was 0.15:2.85:2. Then, wet grinding was performed for the obtained mixture on a grinding mill, in which the dispersing agent was anhydrous ethanol. With respect to 100 weight parts of the mixture, the amount of anhydrous ethanol was 150 weight parts. The grinding was performed at a rotating speed of 500 rpm for 5 hours.

The obtained powder was placed in an oven, and the powder was dried in an air atmosphere at a temperature of 80° C. for 12 hours.

The dried powder was put in the muffle furnace and sintered in an air atmosphere at a temperature of 900° C. for 10 hours. Then, dry grinding was performed for the sinter. Then, the obtained powder was placed in the muffle furnace and sintered in an air atmosphere at a temperature of 1000° C. for 20 hours again, thus obtaining a metal compound having particles with an average volume diameter of 2 μm. The analysis result by ICP-AES showed that the chemical formula of the metal compound was $Cu_{0.15}Ca_{2.85}(PO_4)_2$. The metal compound showed a light cyan color with a hexadecimal color code (i.e., HEX format) of #E1FFFF and a RGB color model (i.e., RGB format) of (225, 255, 255).

(2) Formation of a Polymer Sheet

Polycarbonate, antioxidant 1098, lubricant PE wax, and the metal compound prepared in step (1) were mixed. With respect to 100 weight parts of the polycarbonate, the amount of the metal compound was 40 weight parts, the amount of the antioxidant was 0.05 weight parts, and the amount of the lubricant was 0.04 weight parts. After the obtained mixture was pelleted, the pellets were fed into an injection molding machine to perform injection molding, thus obtaining a polymer sheet with a thickness of 2 mm.

(3) Irradiation and Chemical Plating

The polymer sheet obtained in step (2) was placed on the sample stage of the laser device, then the laser was focused onto the polymer sheet. The movement of the laser beam or the sample stage was controlled by a computer program. The laser device was Hans YLP-20 type laser device. The laser's parameters were set as follows: the wavelength was 1064 nm, the scanning speed was 1000 mm/s, the scanning step was 6 μm, the delay time was 50 μs, the frequency was 30 kHz, the power was 4 kW, and the filling gap was 20 μm. After laser irradiation and/or etching, a decontamination process was performed for the plastic sample, i.e., the polymer sheet, and then the plastic sample was put in a plating solution to perform chemical plating, thus obtaining a plating layer with a thickness of 12 μm. The plating solution included 5 g/L copper sulfate pentahydrate, 25 g/L potassium sodium tartrate, 7 g/L sodium hydroxide, 10 g/L formaldehyde, and 0.1 g/L stabilizer.

The adhesion test result shows that the plating speed is 5 μm/h and the adhesion of the plating layer is ISO Grade 1.

Comparative Example 1

(1) Preparation of a Metal Compound $Cu_2O$, $Cr_2O_3$, and $Al_2O_3$ were mixed uniformly, in which the molar ratio between the $Cu_2O$, $Cr_2O_3$ and $Al_2O_3$ was 1:0.3:0.7. Then, wet grinding was performed for the obtained mixture on a grinding mill, in which the dispersing agent was water. With respect to 100 weight parts of the mixture, the amount of the water was 150 weight parts. The grinding was performed at a rotating speed of 500 rpm for 5 hours.

The obtained powder was placed in an oven, and the powder was dried in an air atmosphere at a temperature of 100° C. for 12 hours.

The dried powder was placed in the muffle furnace and sintered in an air atmosphere at a temperature of 800° C. for 2 hours. Then, dry grinding was performed for the sinter, thus obtaining a metal compound having particles with an average volume diameter of 2 μm. The analysis result by ICP-AES showed that the chemical formula of the metal compound was $Cu_2Cr_{0.6}Al_{1.4}O_{3.3}$. The metal compound showed a light sky blue color with a hexadecimal color code (i.e., HEX format) of #87CEFA and a RGB color model (i.e., RGB format) of (135, 206, 250).

(2) Formation of a Polymer Sheet

The polymer sheet was prepared using substantially the same method as step (2) of Example 1, except that the metal compound was the metal compound prepared in step (1) of Comparative Example 1.

(3) Irradiation and Chemical Plating

The laser irradiation and/or etching and the chemical plating were performed using substantially the same method as step (3) in Example 1, except that the polymer sheet was a polymer sheet prepared in step (2) of Comparative Example 1.

The adhesion test result showed that the plating speed was 5 μm/h, and the adhesion of the plating layer is ISO Grade 1.

Comparative Example 2

(1) Preparation of a Metal Compound

The metal compound was prepared using substantially the same method as step (1) of Comparative Example 1, except that CuO was used instead of $Cu_2O$. The analysis result by ICP-AES showed that the chemical formula of the metal compound was $CuCrAlO_4$. Based on the total amount of the metal compound, the content of the CuO was 0.008 mol %. The color of the metal compound was black with a hexadecimal color code of #000000 and a RGB color model of (0, 0, 0).

(2) Formation of Polymer Sheet

The polymer sheet was prepared using substantially the same method as step (2) of Example 1, except that the metal compound was a metal compound prepared in step (1) of Comparative Example 2. The color of the polymer sheet was black with a hexadecimal color code of #000000 and a RGB color model of (0, 0, 0).

(3) Irradiation and Chemical Plating

The surface of the polymer sheet was metalized using substantially the same method as step (3) of Example 1, except that the polymer sheet was the polymer sheet obtained in step (3) of Comparative Example 2.

Chemical plating was performed using substantially the same method as step (3) in Example 1.

The adhesion test result showed that the plating speed was 2 μm/h, and the adhesion of the plating layer was ISO Grade 4.

Comparative Example 3

(1) Preparation of a Metal Compound

The metal compound was prepared using substantially the same method as step (1) of Comparative Example 1, except that the sintering was performed in an air atmosphere. The analysis result by ICP-AES showed that the chemical formula of the metal compound was $CuCr_{0.3}Al_{0.7}O_4$. The metal compound showed a black color with a hexadecimal color code of #000000 and a RGB color model of (0, 0, 0).

(2) Formation of Polymer Sheet

The polymer sheet was prepared using substantially the same method as step (2) of the Example 1, except that the metal compound was the metal compound prepared in step (1) of Comparative Example 3. The color of the polymer sheet was black with a hexadecimal color code of #000000 and a RGB color model of (0, 0, 0).

(3) Irradiation and Chemical Plating

The surface of the polymer sheet was metalized using substantially the same method as step (3) of the Example 1, except that the polymer sheet was the polymer sheet obtained in step (2) of Comparative Example 3.

Chemical plating was performed using substantially the same method as step (3) in Example 1.

The adhesion test result showed that the plating speed was 2 µm/h, and the adhesion of the plating layer was ISO Grade 4.

By comparing Example 1 with Comparative Examples 1 to 3, it can be seen that the metal compound in the polymer article can be prepared or obtained using conventional raw materials under the conventional sintering conditions, but the obtained metal compound was not only light-colored, but also has a higher activity for promoting or catalyzing chemical plating.

Examples 5 to 9 below describe exemplary ink compositions and exemplary methods for selectively metalizing the surface of an insulating substrate.

Example 5

(1) Preparation of a Metal Compound

The metal compound was prepared using substantially the same method as step (1) of Example 1, except that the metal compound was grinded into particles with an average volume diameter of 80 nm.

(2) Formation of Ink Composition 100 g of the metal compound prepared in step (1), 20 g of a binder (under the trade name of CAB381-0.5 commercially available from Eastman Company, US), 100 g of n-heptanol, 2 g of a dispersing agent (under the trade name of DISPERBYK-165 commercially available from BYK company, Germany), 0.2 g of a defoamer (under the trade name of BYK-051 commercially available from BYK company, Germany), 0.4 g of a leveling agent (under the trade name of BYK-333 commercially available from BYK company, Germany), and 0.5 g of hydrogenated castor oil (commercially available from Wuhan GPC-China Chemistry Co., Ltd., China) were mixed uniformly, thus obtaining an ink composition.

(3) Formation of Ink Layer

The ink composition prepared in step (2) was applied on a surface of an $Al_2O_3$ ceramic substrate by ink jet printing, and then dried at a temperature of 110° C. for 5 hours, thus forming an ink layer on the surface of the substrate.

(4) Chemical Plating

The substrate obtained in step (3) was put in a plating solution to perform chemical plating, thus obtaining a plating layer with a thickness of 2 µm. The plating solution included 5 g/L copper sulfate pentahydrate, 25 g/L potassium sodium tartrate, 7 g/L sodium hydroxide, 10 g/L formaldehyde, and 0.1 g/L stabilizer.

The adhesion test result showed that the plating speed was 8 µm/h and the adhesion of the plating layer was ISO Grade 1.

Comparative Example 4

The ink composition was prepared and coated on the surface of the substrate and chemical plating was performed, using substantially the same method as Example 5, except that the metal compound was prepared using substantially the same method as step (1) of Comparative Example 2.

As a result, a metal layer could not be formed on the surface of the substrate.

Example 7

(1) Preparation of a Metal Compound

The metal compound was prepared using substantially the same method as step (1) of Example 2, except that the sinter was grinded into particles with an average volume diameter of 100 nm.

(2) Formation of Ink Composition 100 g of the metal compound prepared in step (1), 15 g of polyvinyl butyral (under the trade name of Mowital commercially available from Kuraray company, Japan), and 20 g of toluene were mixed uniformly, thus obtaining an ink composition.

(3) Formation of Ink Layer

The ink composition prepared in step (2) was applied on a surface of a poly(ether ether ketone) (PEEK) substrate by ink jet printing, and dried at a temperature of 150° C. for 4 hours, thus forming an ink layer with a thickness of 25 µm on the surface of the substrate.

(4) Chemical Plating

The substrate obtained in step (3) was placed in a plating solution to perform chemical plating, thus obtaining a plating layer with a thickness of 4 µm. The plating solution comprised 5 g/L copper sulfate pentahydrate, 25 g/L potassium sodium tartrate, 7 g/L sodium hydroxide, 10 g/L formaldehyde, and 0.1 g/L stabilizer.

The adhesion test result showed that the plating speed was 5 µm/h and the adhesion of the plating layer was ISO Grade 1.

Example 8

(1) Preparation of a Metal Compound

The metal compound was prepared using substantially the same method as step (1) of Example 3, except that the sinter was grinded into particles with an average volume diameter of 40 nm.

(2) Formation of Ink Composition 100 g of the metal compound prepared in step (1), 30 g of an EVA binder (commercially available from Eastman Company, US), 110 g of toluene, 3 g of a dispersing agent (under the trade name of ANTI-TERRA-U 80 commercially available from BYK company, Germany), 0.5 g of a defoamer (under the trade name of BYK-065 commercially available from BYK company, Germany), 0.5 g of a leveling agent (under the trade name of BYK-306 commercially available from BYK company, Germany), and 0.4 g of hydroxyethyl cellulose (commercially available from Luzhou North Dadong Chemical Co., Ltd., China) were mixed uniformly, thus obtaining an ink composition.

(3) Formation of Ink Layer

The ink composition prepared in step (2) was applied on a surface of a polycarbonate substrate by ink jet printing, and dried at a temperature of 150° C. for 4 hours, thus forming an ink layer with a thickness of 15 μm on the surface of the substrate.

(4) Chemical Plating

The substrate obtained in step (3) was placed in a plating solution to perform chemical plating, thus obtaining a plating layer with a thickness of 3 μm. The plating solution included 5 g/L copper sulfate pentahydrate, 25 g/L potassium sodium tartrate, 7 g/L sodium hydroxide, 10 g/L formaldehyde, and 0.1 g/L stabilizer.

The adhesion test result showed that the plating speed was 5 μm/h and the adhesion of the plating layer was ISO Grade 1.

Example 9

The ink composition was prepared, and a plating layer was formed on the surface of the substrate, using substantially the same method as Example 8, except that before the substrate obtained in step (3) was placed in the plating solution to perform chemical plating, the ink layer formed in step (3) was irradiated using the laser. Then the irradiated substrate was placed in a plating solution to perform chemical plating. The conditions of the laser irradiation were set as follows: the laser wavelength was 1064 nm, the power was 5 W, the frequency was 20 kHz, the line scan speed was 800 mm/s, and the filling gap was 20 μm.

The adhesion test result showed that the plating speed was 9 μm/h and the adhesion of the plating layer was ISO Grade 1.

The results of Examples 5 to 8 indicate that the surface of the substrate having the ink layer formed by the ink composition according to embodiments of the present disclosure has a chemical plating activity, on which chemical plating can be directly performed. By comparing Example 9 with Example 8, it can be seen that before chemical plating was performed on the surface of the substrate having the ink layer formed by the ink composition, the ink layer was irradiated using the laser to gasify the surface of the ink layer, thus achieving a higher plating speed.

What is claimed is:

1. A polymer article comprising a polymer matrix and at least one metal compound dispersed in the polymer matrix, wherein the at least one metal compound is a compound represented by formula (I), $$A_xCu_y(PO_4)_2 \qquad (I),$$

wherein in formula (I), A represents at least one element selected from Group IIA of the periodic table of elements, x/y=0.1 to 20, x+y=3; and the at least one metal compound is selected from a group including $Cu_{2.7}Mg_{0.3}(PO_4)_2$, $Cu_{1.5}Mg_{1.5}(PO_4)_2$, $Cu_{1.5}Ba_{0.75}Sr_{0.75}(PO_4)_2$, $Cu_{0.15}Mg_{2.85}(PO_4)_2$, $Cu_{1.5}Ca_{1.5}(PO_4)_2$, $Cu_{0.15}Ca_{2.85}(PO_4)_2$, $Cu_2Ba(PO_4)_2$, $CuSr_2(PO_4)_2$, $Cu_{0.4}Sr_{2.6}(PO_4)_2$, or a combination thereof.

2. The polymer article according to claim 1, wherein of the total content of the polymer article, the content of the at least one metal compound ranges from 1 wt % to 40 wt %.

3. The polymer article according to claim 1, wherein, in formula (I), A represents at least one element selected from a group including Ca, Mg, Ba, Sr, or a combination thereof.

4. A method for selectively metalizing a polymer article, comprising steps of:

irradiating a selected part of a surface of the polymer article to be metalized with an energy beam; and performing chemical plating on the irradiated part of the polymer article, wherein the polymer article comprises a polymer matrix and at least one metal compound dispersed in the polymer matrix, wherein the at least one metal compound is a compound represented by formula (I), $$A_xCu_y(PO_4)_2 \qquad (I),$$

wherein in formula (I), A represents at least one element selected from Group IIA of the periodic table of elements, x/y=0.1 to 20, x+y=3; and the at least one metal compound is selected from a group including $Cu_{2.7}Mg_{0.3}(PO_4)_2$, $Cu_{1.5}Mg_{1.5}(PO_4)_2$, $Cu_{1.5}Ba_{0.75}Sr_{0.75}(PO_4)_2$, $Cu_{0.15}Mg_{2.85}(PO_4)_2$, $Cu_{1.5}Ca_{1.5}(PO_4)_2$, $Cu_{0.15}Ca_{2.85}(PO_4)_2$, $Cu_2Ba(PO_4)_2$, $CuSr_2(PO_4)_2$, $Cu_{0.4}Sr_{2.6}(PO_4)_2$, or a combination thereof.

5. The method according to claim 4, wherein of the total content of the polymer article, the content of the at least one metal compound ranges from 1 wt % to 40 wt %.

6. The method according to claim 4, wherein, in formula (I), A represents at least one element selected from a group including Ca, Mg, Ba, Sr, or a combination thereof.

7. The method according to claim 4, wherein the energy beam is a laser.

8. The method according to claim 7, wherein the laser has a wavelength ranging from 157 nm to 10.6 μm, a scanning speed ranging from 500 mm/s to 8000 mm/s, a scanning step ranging from 3 μm to 9 μm, a delay time ranging from 30 μs to 100 μs, a frequency ranging from 30 kHz to 40 kHz, a power ranging from 3 kW to 4 kW, and/or a filling gap ranging from 10 μm to 50 μm.

* * * * *